No. 787,438. PATENTED APR. 18, 1905.
W. CUTLER.
MOLD FOR BENDING AND SHAPING SHEET GLASS, &c.
APPLICATION FILED MAR. 30, 1904.

3 SHEETS—SHEET 1.

Witnesses.

Inventor.

No. 787,438. PATENTED APR. 18, 1905.
W. CUTLER.
MOLD FOR BENDING AND SHAPING SHEET GLASS, &c.
APPLICATION FILED MAR. 30, 1904.

3 SHEETS—SHEET 2.

Witnesses.
Inventor.

No. 787,438. PATENTED APR. 18, 1905.
W. CUTLER.
MOLD FOR BENDING AND SHAPING SHEET GLASS, &c.
APPLICATION FILED MAR. 30, 1904.

3 SHEETS—SHEET 3.

No. 787,438.

Patented April 18, 1905.

UNITED STATES PATENT OFFICE.

WILLIAM CUTLER, OF BIRMINGHAM, ENGLAND.

MOLD FOR BENDING AND SHAPING SHEET-GLASS, &c.

SPECIFICATION forming part of Letters Patent No. 787,438, dated April 18, 1905.

Application filed March 30, 1904. Serial No. 200,739.

*To all whom it may concern:*

Be it known that I, WILLIAM CUTLER, manufacturer, a subject of the King of Great Britain, and a resident of 71 Gough road, Edgbaston, Birmingham, in the county of Warwick, England, have invented certain new and useful Improvements in the Molds for Bending and Shaping Sheet-Glass and the Like, (for which I have applied for a patent in Great Britain, No. 28,306, dated the 24th day of December, 1903,) of which the following is a specification.

This invention refers to the molds used in the process of bending and shaping sheet, plate, or crown glass into various articles by the action of the atmospheric pressure on the one side of the heated glass while the air is being exhausted so as to remove the pressure from the other side, as set forth in United States of America Patent No. 544,248, dated the 7th of August, 1895, the object of these improvements being to prevent the articles from being marked or misshaped by the exhaust-outlet and at the same time render it possible to obtain a larger variety of shapes than hitherto—such, for instance, as in the formation of articles partly square and partly circular or the provision of protrusions to form feet and the like projections upon glass dishes for photographic and many other purposes. Such improved molds also enable square corners or angles of articles to be molded perfectly true and sharp where so required, while in all cases the article can be more readily removed from the mold without damage and while in a heated state.

In order that this invention may be clearly understood and more easily carried into practice, I have appended hereunto three sheets of drawings, upon which I have illustrated the nature of my said invention.

Figure 1:
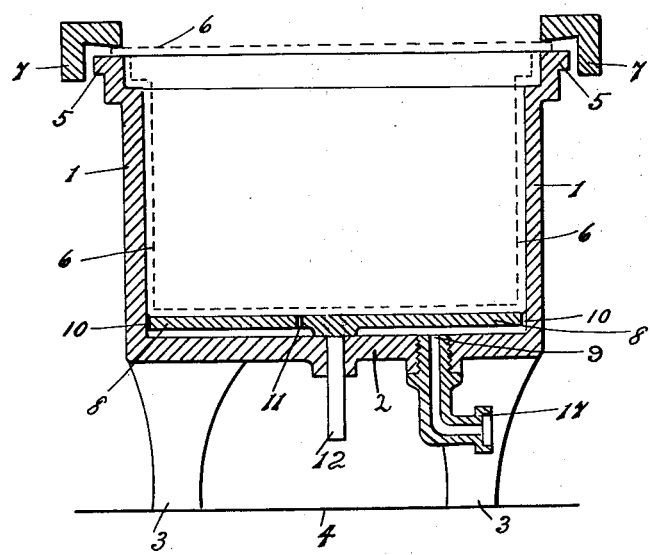
Figure 2:
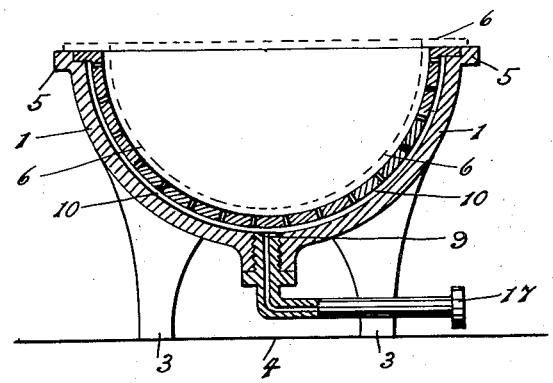
Figure 3:
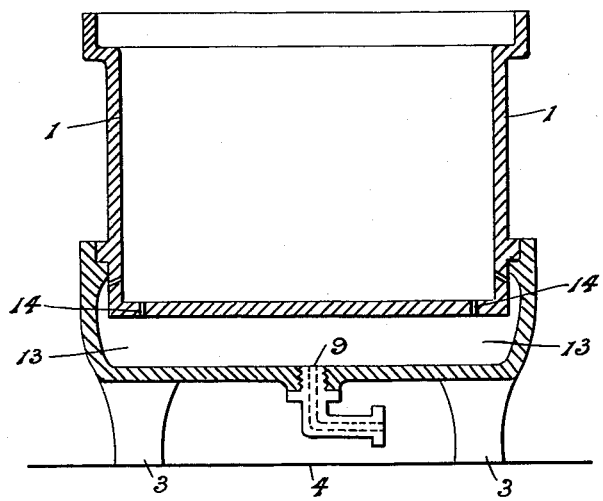
Figure 4:
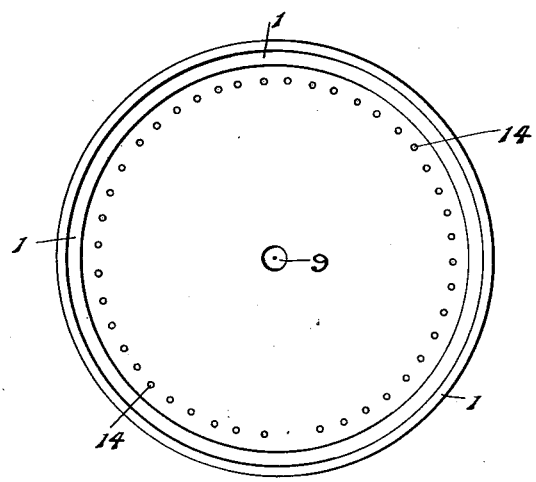
Figure 5:
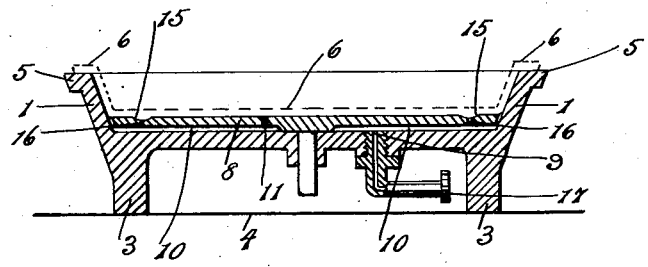
Figure 6:
Figure 7:
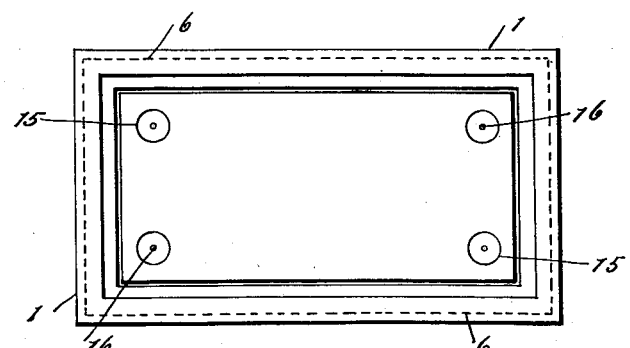

Figure 1 is a section through a mold for shaping glass jars. Fig. 2 is a section showing the application of the invention to a mold for shaping glass domes. Fig. 3 is a similar section to that of Fig. 1, but showing a modification. Fig. 4 is a plan of Fig. 3. Fig. 5 is a section through a mold suitable for shaping glass dishes. Fig. 6 is a section though the false bottom when detached from the mold illustrated by Fig. 5. Fig. 7 is a plan of Fig. 5.

In this process of shaping or bending glass the molds, which are of metal, are formed to the required shape—as, for example, in the case of a glass jar the mold 1 is circular on plan, with a flat bottom 2, and is preferably provided with suitable legs or supports 3, so that the bottom of the mold stands above the furnace-bottom 4.

A flanged rim 5 is provided around the top of the mold to receive the edges of the sheet 6 of heated glass, from which the article is to be formed, while such edges are retained in the flanged rim by a frame 7 of suitable weight, which is lowered onto the rim 5 and which clamps the edges in the rim during the process of bending or shaping, which is effected by exhausting the air from within the mold 1 by any suitable means, thereby forming a vacuum which draws the sheet 6 to the shape of the mold.

In the case of these improvements the eduction-pipe 17 is connected to the lower part of the mold in any convenient position, while a false bottom or lining 8 is provided in the mold, which covers the whole of the bottom, including the outlet 9 to the eduction-pipe 17, but between the edge of which and the sides of the mold a sufficient space 10 is left for the passage of the air during the process of eduction, by which means the air is drawn from the angles of the mold, thus forming an article of perfect shape, while in some cases a small perforation, such as 11, may be provided in or near the center of the false bottom 8 for the purpose of drawing any air which may become imprisoned in the center of the bottom.

For readily removing the article when formed to the required shape the false bottom 8 is made loose and is provided with a stem 12, which passes through the ordinary bottom 2 of the mold 1 and by which the false bottom 8 can be raised after the removal of the clamp, thus simultaneously raising the article a sufficient distance in the mold to enable it to be readily removed.

Instead of the false bottom a vacuum-chamber 13, Fig. 3, may be provided below or around the mold, with which chamber the eduction-pipe is connected, in which case small perforations 14 are provided between the mold and the chamber, which perforations are preferably arranged around the angle of the bottom of the mold or in any other position suitable for the shape of the particular article being formed.

In cases where protrusions are required upon the bottom of the article, as in the case of the projecting feet or supports of photographic dishes or other articles, as illustrated by Figs. 5, 6, and 7, the false bottom 8 of the mold is provided with indentations 15 of the required shape, and a small perforation 16 is provided in each indentation for enabling the air to be educted from the indentation, and by which the glass is drawn into the shape of the projection required.

Such chambers 13 outside the mold, as hereinbefore described, may in some cases be provided around the sides of the mold, such as illustrated by Fig. 3, in which case the perforations between the chamber and the mold are arranged at the points most suitable to the required shape of the article.

Having now described my invention, what I claim as new, and desire to secure by Letters Patent, is—

1. In shaping or bending sheet-glass by the exhaust of the air so as to produce a vacuum, the combination with the mold of a false bottom or lining and a vacuum-chamber with air-passages between the mold and the chamber which are so distributed that the air is exhausted from various parts or at different points of the mold so as to accommodate the various articles to be shaped, substantially for the purpose set forth.

2. In shaping or bending sheet-glass in a mold by the exhaust of the air so as to produce a vacuum, a mold having a loose bottom or lining and vacuum-chamber with air-passages between the mold and the chamber which are so distributed that the air is exhausted from various parts or at different points of the mold so as to accommodate the various articles to be shaped, in combination with a stem or connection to the bottom or lining which is mounted to slide in the mold or casing so as to be operated from the exterior and enable the article to be raised from the mold, substantially for the purpose set forth.

In witness whereof I have hereunto set my hand in the presence of two witnesses.

WILLIAM CUTLER.

Witnesses:
WALTER H. E. BARTLAM,
JUSTUS JONES.